United States Patent
Ning et al.

(10) Patent No.: US 11,379,995 B2
(45) Date of Patent: Jul. 5, 2022

(54) SYSTEM AND METHOD FOR 3D OBJECT DETECTION AND TRACKING WITH MONOCULAR SURVEILLANCE CAMERAS

(71) Applicants: JINGDONG DIGITS TECHNOLOGY HOLDING CO., LTD., Beijing (CN); JD FINANCE AMERICA CORPORATION, Wilmington, DE (US)

(72) Inventors: Guanghan Ning, Sunnyvale, CA (US); Harry Huang, Mountain View, CA (US)

(73) Assignees: JINGDONG DIGITS TECHNOLOGY HOLDING CO., LTD., Beijing (CN); JD FINANCE AMERICA CORPORATION, Wilmington, DE (US)

( * ) Notice: Subject to any disclaimer, the term of this patent is extended or adjusted under 35 U.S.C. 154(b) by 113 days.

(21) Appl. No.: 16/929,838

(22) Filed: Jul. 15, 2020

(65) Prior Publication Data
US 2022/0020158 A1   Jan. 20, 2022

(51) Int. Cl.
*G06T 7/246* (2017.01)
*G06T 7/277* (2017.01)
(Continued)

(52) U.S. Cl.
CPC ............. *G06T 7/246* (2017.01); *G06T 7/277* (2017.01); *G06V 20/52* (2022.01); *G06V 20/64* (2022.01);
(Continued)

(58) Field of Classification Search
None
See application file for complete search history.

(56) References Cited

U.S. PATENT DOCUMENTS 11,093,829 B2 * 8/2021 Hu .................. B60W 30/18163
2015/0235379 A1 * 8/2015 O'Gorman ............ H04N 5/147
382/103
(Continued)

FOREIGN PATENT DOCUMENTS

CN  109285180 A  1/2019
CN  110533687 A  12/2019

OTHER PUBLICATIONS

SSD Single Shot Multibox Detector. W. Liu et al. Mar. 2016 (Year: 2016).*

(Continued)

*Primary Examiner* — Delomia L Gilliard
(74) *Attorney, Agent, or Firm* — Scully, Scott, Murphy & Presser, P.C.

(57) ABSTRACT

A system and a method for cooperative maneuvering and cooperative risk warning of vehicles. The system includes monocular surveillance cameras, local computing devices, and a master server. Each local computing device receives video frames from the camera, detects and tracks vehicles from the video frames, and converts the video frames to bird-view. Each detected vehicle is represented by a detection vector having first dimensions representing two dimensional (2D) parameters of the vehicle and second dimensions representing three dimensional (3D) parameters of the vehicle. Tracking of the vehicles is performed by minimizing loss calculated based on the first dimensions and the second dimensions of the detection vectors. The master server receives bird-views from different computing devices and combines the bird-views into a global bird-view, and performs cooperative maneuvering and cooperative risk warning of the vehicles using the global bird-view.

20 Claims, 6 Drawing Sheets

(51) Int. Cl.
*H04N 7/18* (2006.01)
*H04W 4/40* (2018.01)
*G08G 1/04* (2006.01)
*G08G 1/01* (2006.01)
*H04N 5/262* (2006.01)
*G06V 20/52* (2022.01)
*G06V 20/64* (2022.01)
*B60W 50/14* (2020.01)
*B60W 60/00* (2020.01)

(52) U.S. Cl.
CPC ............ *G08G 1/0108* (2013.01); *G08G 1/04* (2013.01); *H04N 5/2628* (2013.01); *H04N 7/183* (2013.01); *H04W 4/40* (2018.02); *B60W 50/14* (2013.01); *B60W 60/0025* (2020.02); *B60W 2420/42* (2013.01); *G06T 2207/10016* (2013.01); *G06T 2207/20084* (2013.01); *G06T 2207/30232* (2013.01); *G06T 2207/30236* (2013.01); *G06T 2207/30241* (2013.01); *G06T 2207/30252* (2013.01)

(56) References Cited

U.S. PATENT DOCUMENTS

| | | | |
|---|---|---|---|
| 2016/0225121 A1* | 8/2016 | Gupta | G06T 3/00 |
| 2017/0193648 A1 | 7/2017 | Stelzer et al. | |
| 2018/0211117 A1* | 7/2018 | Ratti | G06K 9/00785 |
| 2018/0242190 A1* | 8/2018 | Khoryaev | H04W 28/0289 |
| 2018/0268240 A1* | 9/2018 | Loce | G11B 27/105 |
| 2019/0026917 A1* | 1/2019 | Liao | G06N 3/0454 |
| 2019/0130191 A1* | 5/2019 | Zhou | G06K 9/4604 |
| 2019/0244028 A1* | 8/2019 | Jones | G06K 9/6274 |
| 2019/0244366 A1* | 8/2019 | Yu | G06N 3/0454 |
| 2019/0370980 A1 | 12/2019 | Hollander et al. | |
| 2020/0035092 A1* | 1/2020 | Rajab | G08G 1/167 |
| 2020/0057487 A1* | 2/2020 | Sicconi | G06T 7/174 |
| 2020/0082560 A1* | 3/2020 | Nezhadarya | G06T 7/70 |
| 2020/0133307 A1* | 4/2020 | Kelkar | G08G 1/22 |
| 2020/0143199 A1* | 5/2020 | Kim | G06K 9/72 |
| 2020/0160546 A1* | 5/2020 | Gu | G06N 3/08 |
| 2020/0312155 A1* | 10/2020 | Kelkar | G08G 1/096758 |
| 2020/0365029 A1* | 11/2020 | Kourous-Harrigan | G05D 1/0231 |
| 2021/0042942 A1* | 2/2021 | Emrich | G06T 7/33 |
| 2021/0150203 A1* | 5/2021 | Liu | G06T 7/143 |
| 2021/0150230 A1* | 5/2021 | Smolyanskiy | G06K 9/6256 |
| 2021/0281814 A1* | 9/2021 | Guizilini | H04N 13/261 |
| 2021/0291835 A1* | 9/2021 | Jalali | G08G 1/167 |
| 2021/0295703 A1* | 9/2021 | Jalali | G08G 1/096725 |
| 2021/0302992 A1* | 9/2021 | Chen | G06T 7/70 |
| 2021/0357746 A1* | 11/2021 | Wu | G06N 3/0454 |

OTHER PUBLICATIONS

Sheng-hai An, Byung-Hyug Lee, and Dong-Ryeol Shin, A survey of intelligent transportation systems, 2011 Third International Conference on Computational Intelligence, Communication Systems and Networks, IEEE, 2011.

Ling Sun, Yameng Li, and Jian Gao, Architecture and application research of cooperative intelligent transport systems, Procedia Engineering, 2016, 137: 747-753.

Cooperative vehicle infrastructure system (CVIS) and vehicle to everything (V2X) industry report, 2018.

Shangguan Wei, Yu Du, and Linguo Chai, Interactive perception-based multiple object tracking via CVIS and AV, IEEE, 2019, 7: 121907-121921.

Tong He, and Stefano Soatto, Mono3d++: monocular 3D vehicle detection with two-scale 3D hypotheses and task priors, AAAI, 2018, 8409-8416.

Xiaozhi Chen, Kaustav Kundu, Yukun Zhu, Andrew Berneshawi, Huimin Ma, Sanja Fidler, and Raquel Urtasun, 3D object proposals for accurate object class detection, NIPS, 2015.

Arsalan Mousavian, Dragomir Anguelov, John Flynn, and Jana Kosecka, 3D bounding box estimation using deep learning and geometry, CVPR, 2017, 5632-5640.

Erik Linder-Nom and Fredrik Gustafsson, Automotive 3d object detection without target domain annotations, Master of Science Thesis, 2018.

Joseph Redmon, and Ali Farhadi, YOLOv3: An incremental improvement, 2018, arXiv:1804.02767.

Xingyi Zhou, Dequan Wang, and Philipp Krahenbuhl, Objects as Points, 2019, arXiv:1904.07850.

Hou-Ning Hu, et al., Joint monocular 3D Vehicle detection and tracking, Proceedings of the IEEE ICCV, 2019, 5390-5399.

Jason Ku, Alex D. Pon, and Steven L. Waslander, Monocular 3D object detection leveraging accurate proposals and shape reconstruction, Proceedings of the IEEE CVPR, 2019, arXiv:1904.01690.

Guanghan Ning, and Heng Huang, LightTrack: a generic framework for online top-down human pose tracking, 2019, arXiv:1905.02822.

Avidan, Shai et al., Trajectory Triangulation: 3D Reconstruction of Moving Points from a Molecular Image Sequence, IEEE Transactions on Pattern Analysis and Machine Intelligence, Apr. 30, 2020, No. 4, vol. 22.

PCT/CN2021/106588, International Search Report and the Written Opinion, dated Oct. 20, 2021.

\* cited by examiner

SYSTEM AND METHOD FOR 3D OBJECT DETECTION AND TRACKING WITH MONOCULAR SURVEILLANCE CAMERAS

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD OF THE DISCLOSURE

The present disclosure relates generally to object detection and tracking, and more specifically related to a cooperative vehicle-infrastructure system that uses monocular surveillance cameras to detect and track vehicles.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Intelligent transport systems (ITS) are transport systems in which advanced information, communication, computers, sensors and control technologies are integrated and applied in the field of transportation to increase safety, sustainability, efficiency, and comfort. As an integrated system of people, roads and vehicles, it provides drivers with the road information and convenient services to reduce traffic congestion and to increase road capacity.

As the advanced stage of ITS, cooperative vehicle infrastructure system (CVIS) can acquire vehicle and road information by use of wireless communication and sensor detection technologies, allowing interaction and data sharing between vehicles and infrastructures. The system is a good solution to intelligent communication and coordination between vehicles and infrastructures, making system resources used in a more efficient way, enabling safer road traffic and reducing traffic jams. It interprets the intentions of traffic participants with great precision, and can substantially improve perception of autonomous vehicles. Vision, radar, light detection and ranging (LiDAR) and other sensors can be mounted on cars and streetlight poles which evolve into all-in-one signal poles, all-in-one traffic poles, and all-in-one electric alarm poles. The simultaneous perception of cars and road terminals can minimize blind zones and notify the collision out of sight in advance.

CVIS deals with technologies such as intelligent onboard system technology, intelligent road test technology, and vehicle to everything (V2X). Autonomous driving is one of the major application of V2X communication and it may cause the first major impact on the lifestyle of people. V2X communication overcomes two limitations of existing autonomous vehicles that are solely based on a perception subsystem consisting of onboard sensors: (1) the limited perception range of onboard sensors only allows for detecting adjacent vehicles; (2) the vehicles are unable to cooperate in order to efficiently perform maneuvers with a high complexity. These drawbacks can be overcome because V2X enables two key features in autonomous vehicles: (1) cooperative sensing, which increases the sensing range by means of the mutual exchange of sensed data; and (2) cooperative maneuvering, which enables a group of autonomous vehicles to drive coordinately according to a common centralized or decentralized decision-making strategy. To ensure safety and increase efficiency, real-time alerts originated from a trusted source are sent to drivers and pedestrians, providing information about road hazards, congestion conditions, the presence of emergency vehicles.

As shown in FIG. 1, there are mainly four modes of operation deployed in V2X. (1) Vehicle-to-vehicle (V2V), (2) Vehicle-to-infrastructure (V2I), (3) Vehicle-to-pedestrian (V2P), and (4) Vehicle-to-Network (V2N). V2I can provide vehicles with information, such as available parking space, traffic congestion, road condition, etc. V2I application information is produced by a locally available application server and transmitted through a Remote Switching Unit (RSU), where RSUs are roadside stationary units, which act as a transceiver. To improve the efficiency and accuracy of V2I application, use of different types of sensors, such as high resolution cameras, ultra high frequency (UHF) band radio waves is recommended. However, the cost of using multiple types of sensors is high, and the requirement for computing resources to integrate the information from those sensors is demanding.

Therefore, an unaddressed need exists in the art to address the aforementioned deficiencies and inadequacies.

SUMMARY OF THE DISCLOSURE

In certain aspects, the present disclosure relates to a system. In certain embodiments, the system includes a camera and a computing device in communication with the camera. The computing device is configured to:

receive a plurality of video frames from the camera;

detect an object from the video frames, where the detected object in each of the video frames is represented by a detection vector, the detection vector comprises first dimensions representing two dimensional (2D) parameters of the object and second dimensions representing three dimensional (3D) parameters of the object;

track the object in the video frames based on the detection vectors of the object from the video frames to obtain a trajectory of the object, where minimization of loss in tracking of the object is calculated based on the first dimensions and the second dimensions of the detection vectors; and transform the video frames into bird-view, wherein the bird view of the video frames comprises the trajectory of the object.

In certain embodiments, the object is a vehicle and the system further includes a server computing device. The server computing device is configured to receive the bird-view of the video frames from the computing device, and to perform at least one of cooperative maneuvering and cooperative risk warning using the received bird-view of the video frames.

In certain embodiments, the computing device, the server computing device and the vehicle are in communication through 5th generation mobile network.

In certain embodiments, the 2D parameters of the object comprises location and size of a 2D bounding box in the corresponding one of the video frames that encloses the object, and the 3D parameters of the object comprises vertices, center point, and orientation of a 3D box in the corresponding one of the video frames that encloses the object.

In certain embodiments, the computing device is configured to detect the 2D parameters and the 3D parameters of the object simultaneously using a single-shot 3D object detector.

In certain embodiments, the computing device is configured to detect the 2D parameters of the object using a 2D object detector and detect the 3D parameters of the object using a 3D object detector, the 2D detector detects the 2D parameters of the object from the video frame, and the 3D object detector detects the 3D parameters of the objects from the 2D parameters.

In certain embodiments, the computing device is configured to track the object using a graphic convolution-long short term memory (GC-LSTM) network, and the GC-LSTM network employs a Siamese graph convolutional network (GCN) to associate identification of the object in the video frames based on the 2D parameters of the object, the 3D parameters of the object, and visual features of the object.

In certain embodiments, the computing device is configured to track the object using a Kalman filter and a Hungarian algorithm, the Kalman filter is used to optimize the 2D parameters and the 3D parameters of the detected object, and the Hungarian algorithm is used to associate identification of the object in the video frames.

In certain embodiments, the camera comprises a monocular surveillance camera and the computing device is further configured to calibrate the monocular surveillance camera. In certain embodiments, the camera and the computing device are installed on a traffic pole.

In certain embodiments, the computing device is configured to detect the object and track the object using a build-in chip.

In certain aspects, the present disclosure relates to a method. In certain embodiments, the method includes the steps of:

receiving, by a computing device, a plurality of video frames captured by a camera;

detecting, by the computing device, an object from the video frames, where the detected object in each of the video frames is represented by a detection vector, the detection vector comprises first dimensions representing two dimensional (2D) parameters of the object and second dimensions representing three dimensional (3D) parameters of the object;

tracking, by the computing device, the object in the video frames based on the detection vectors of the object from the video frames to obtain a trajectory of the object, where minimization of loss in tracking of the object is calculated based on the first dimensions and the second dimensions of the detection vectors; and transforming, by the computing device, the video frames into bird-view, wherein the bird view of the video frames comprises the trajectory of the object.

In certain embodiments, the object is a vehicle, and the method further includes:

receiving, by a server computing device, the bird-view of the video frames from the computing device; and performing, by the server computing device, at least one of cooperative maneuvering and cooperative risk warning using the received bird-view of the video frames.

In certain embodiments, the 2D parameters of the object comprises location and size of a 2D bounding box in the corresponding one of the video frames that encloses the object, and the 3D parameters of the object comprises vertices, center point, and orientation of a 3D box in the corresponding one of the video frames that encloses the object.

In certain embodiments, the detection of the 2D parameters and the 3D parameters of the object is performed simultaneously using a single-shot 3D object detector.

In certain embodiments, the detection of the 2D parameters and 3D parameters of the object are performed respectively using a 2D object detector and a 3D object detector, the 2D detector detects the 2D parameters of the object from the video frame, and the 3D object detector detects the 3D parameters of the objects from the 2D parameters.

In certain embodiments, the step of tracking the object is performed using a graphic convolution-long short term memory (GC-LSTM) network, and the GC-LSTM network employs a Siamese graph convolutional network (GCN) to associate identification of the object in the video frames based on the 2D parameters of the object, the 3D parameters of the object, and visual features of the object.

In certain embodiments, the step of tracking the object is performed using a Kalman filter and a Hungarian algorithm, the Kalman filter is used to optimize the 2D parameters and the 3D parameters of the detected object, and the Hungarian algorithm is used to associate identification of the object in the video frames.

In certain embodiments, the camera includes a monocular surveillance camera.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
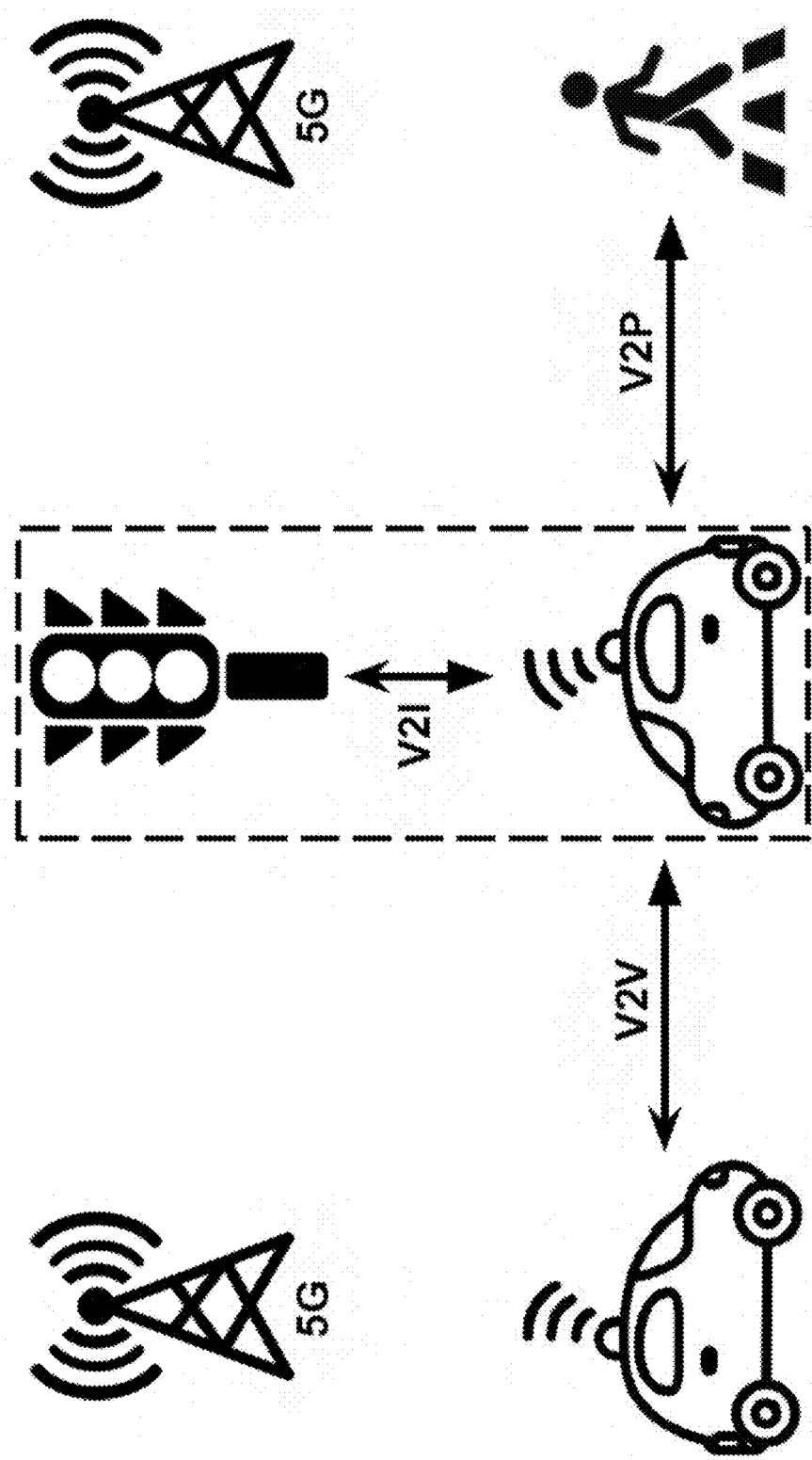
FIG. 1 schematically depicts vehicle to everything interaction in a 5G network environment.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

The combination of autonomous vehicles and V2I technology enables two key cooperative features: sensing and maneuvering. Among other important information, vehicle 3D extents and trajectories are critical cues for predicting the future location of vehicles (sensing) and planning future motion based on those predictions (maneuvering). In certain aspects, the present disclosure provides a system to detect and track multiple vehicles with a static monocular surveillance camera and a corresponding locally available application server, and map these vehicles to camera coordinate system for transmission via a local RSU. The location and identities of these vehicles are exhibited in bird view for cooperative sensing and maneuvering.

Figure 2:
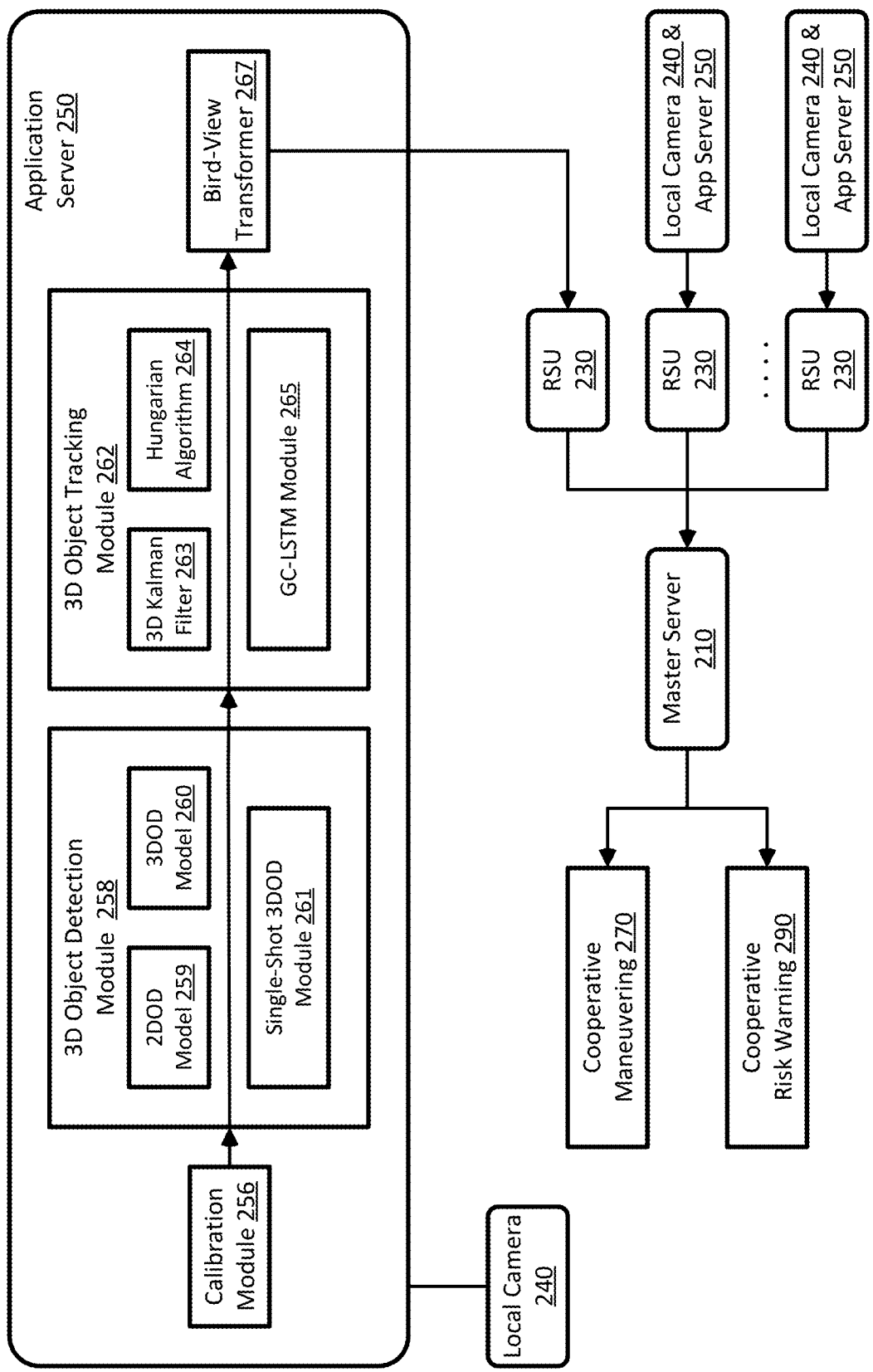
FIG. 2 schematically depicts data flow of a cooperative vehicle-infrastructure system according to certain embodiments of the present disclosure.

FIG. 2 schematically depicts data flow of a cooperative vehicle-infrastructure system according to certain embodiments of the present disclosure. As shown in FIG. 2, the system include a master server 210, multiple local remote switching units (RSUs) 230, multiple local cameras 240, and multiple local application servers 250. Each local application server 250 includes a calibration module 256. The calibration module 256 calibrates the local camera 240, instructs the local camera 240 to take videos of environment, receives video frames from the local camera 240, and prepares and provides the received video frames to the 3D object detection module 258. The 3D object detection module 258 receives the calibrated video frames, and detects 2D objects and 3D objects, such as vehicles in the video. Then the 3D objects tracking module 262 tracks the objects in the video. The bird-view transformer 267 transforms the view of the video with objects into bird-view. The bird-view of the local application server 250 is then transferred to the master server 210 through the RSU 230. When the bird-views in the different camera coordinate systems are available, the master server 210 combines those bird-views to obtain a global bird-view in a defined area covered by the local cameras 240. With the global bird-view of the area and the detected objects in the global area, the master server 201 can perform cooperative maneuvering 270 and cooperative risk warning 290. Those maneuvering and risk warning may be sent back to the objects via the master server 210, the local RSU 230 and the local application server 250, where the local application server 250 may directly instruct operation of the objects or communicate with the objects. In certain embodiments, the master server 210 may also communicate with the objects through other means. In certain embodiments, the objects are vehicles or self-driving vehicles.

Each local camera 240 may be installed on a traffic pole. The corresponding local application server 250 may be installed on the traffic pole or a place close to the traffic pole. In certain embodiments, the local application server 250 may also be placed far from the traffic pole, as long as the communication between the local camera 240 and the remotely placed local application server 250 is efficient, and communication from the local application server 250 and/or the master server 210 to the vehicles close to the traffic pole is efficient. In certain embodiments, the function of the local application servers 250 may also be integrated into the master server 210.

In certain embodiments, the 3D object detection module 258 is performed using a two dimensional object detection (2DOD) model 259 and a three dimensional object detection (3DOD) model 260. The combination of 2DOD model 259 and the 3DOD model 260 is a top down approach. In certain embodiments, after detecting 2D bounding boxes of objects from the video frames captured by the local camera 240, the disclosure further uses these 2D detections to reduce the search space while further regressing the 3D bounding boxes. Alternatively, the 3D object detection module 258 is performed using the single-shot 3D object detection (3DOD) module 261. This is a bottom-up approach, where the disclosure performs joint 2D and 3D object detection in one shot. In certain embodiments, the 3D objection detection module 258 may provide both the above top down approach and the bottom up approach, and provide a mechanism to choose from one of the approaches based on certain criteria, such as location of the local camera 240, quality of the videos captured by the local camera 240, distance between the local camera 240 to other neighboring local cameras 240, computing power of the application server 250, and requirement of a specific task such as the cooperative maneuvering and the cooperative risk warning. In certain embodiments, the 3D object detection module 258 may only include the single-shot 3DOD module 261, or only includes the 2DOD model 259 and the 3DOD model 260. In certain embodiments, the input of the 3D object detection module 258 is a serious video frames, and the output of the 3D object detection module 258 is the video frames, the 2D bounding boxes of the objects in the video frames, and the 3D objects information. In certain embodiments, the 2D information and the 3D information of the objects are combined to form a vector for each detected object.

In certain embodiments, the 3D object tracking module 262 is performed using a 3D Kalman filter 263 and a Hungarian algorithm 264. The Kalman filter 263 is used to smooth trajectories of the 2D and 3D objects, and the Hungarian algorithm 264 is used to associate identifications of the objects in the video frames. The Kalman filter 263 and the Hungarian algorithm 264 may be performed in serial or in parallel. Alternatively, the 3D object tracking module 262 is performed using the GC-LSTM module 265. In certain embodiments, the GC-LSTM module 265 performs online tracking, with a side effect of smoothing the trajectories. Further, the GC-LSTM module 265 uses a Siamese GCN to associate IDs of the objects, such as ID of the vehicles. In certain embodiments, the 3D objection tracking module 262 may provide both the above two tracking approaches, and provide a mechanism to choose from one of the approaches based on certain criteria, such as the location of the local camera 240, the quality of the videos captured by the local camera 240, the number of objects or vehicles in the video, the distance between the local camera 240 to other neighboring local cameras 240, and the computing power of the application server 250. In certain embodiments, the 3D object tracking module 262 may only include the GC-LSTM module 265, or only includes the 3D Kalman filter 263 and the Hungarian algorithm 264.

The video frames with detected and tracked objects can be converted form the camera coordinate system to the bird-view by the bird-view transformer 267. The local bird-views from multiple local application servers 250 are transmitted to the master server 210 through respective RSUs 230. The master server 210 combines the bird-views into one global bird-view under the world coordinate system, and the master server 210 can use the global bird-view, preferably with other related information, to realize cooperative maneuvering and cooperative risk warning. In certain embodiments, the bird-view transformer 267 may also be a component of the master server 210 instead of the local application server 250.

Figure 3:
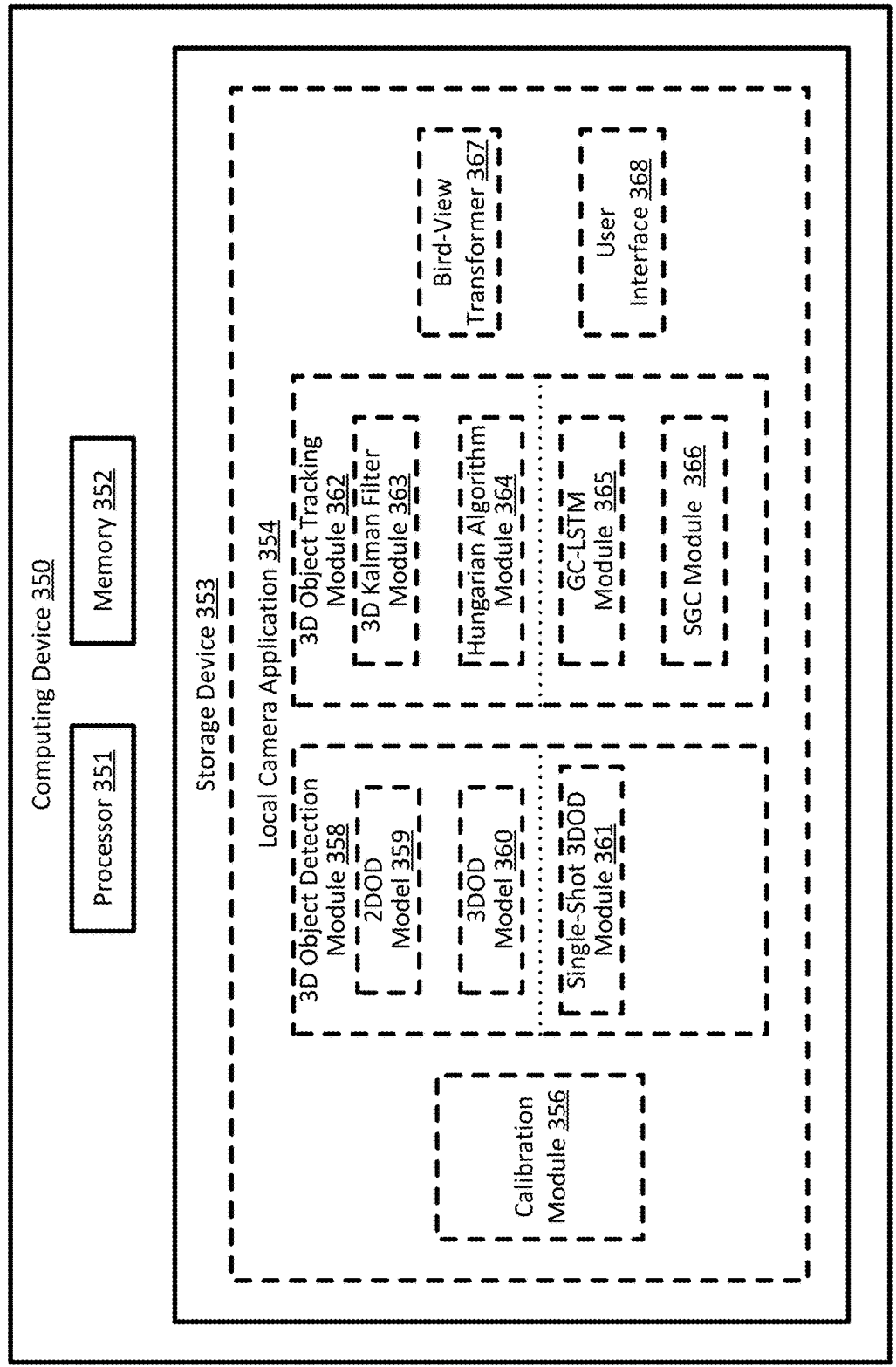
FIG. 3 schematically depicts a computing device of a vision-centric 3D object detection and tracking system according to certain embodiments of the disclosure.

FIG. 3 schematically depicts a cooperative vehicle infrastructure system (CVIS) according to certain embodiments of the present disclosure. In certain embodiments, the CVIS 300 include multiple computing devices 350. The computing device 350 may be a server computer, a cluster, a cloud computer, a general-purpose computer, a headless computer, or a specialized computer, which provides object detection and object tracking from video frames, and provides bird-view of the objects in the camera coordinate system. In certain embodiments, each computing device 350 may correspond to one of the application server 250 shown in FIG. 2. As shown in FIG. 3, the computing device 350 may include, without being limited to, a processor 351, a memory 352, and a storage device 353. In certain embodiments, the computing device 350 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 351 may be a central processing unit (CPU) which is configured to control operation of the computing device 350. The processor 351 can execute an operating system (OS) or other applications of the computing device 350. In certain embodiments, the computing device 350 may have more than one CPU as the processor, such as two CPUs, four CPUs, eight CPUs, or any suitable number of CPUs.

The memory 352 can be a volatile memory, such as the random-access memory (RAM), for storing the data and information during the operation of the computing device 350. In certain embodiments, the memory 352 may be a volatile memory array. In certain embodiments, the computing device 350 may run on more than one memory 352.

In certain embodiments, the computing device 350 may further include graphic card to assist the processor 351 and the memory 352 with image processing and display.

The storage device 353 is a non-volatile data storage media for storing the OS (not shown) and other applications of the computing device 350. Examples of the storage device 353 may include non-volatile memory such as flash memory, memory cards, USB drives, hard drives, floppy disks, optical drives, or any other types of data storage devices. In certain embodiments, the computing device 350 may have multiple storage devices 353, which may be identical storage devices or different types of storage devices, and the applications of the computing device 350 may be stored in one or more of the storage devices 353 of the computing device 350.

In this embodiments, the processor 351, the memory 352, the storage device 353 are component of the computing device 350, such as a server computing device. In other embodiments, the computing device 350 may be a distributed computing device and the processor 351, the memory 352 and the storage device 353 are shared resources from multiple computers in a pre-defined area.

The storage device 353 includes, among other things, a local camera application 354. The local camera application 354 includes a calibration module 356, a 3D object detection module 358, a 3D object tracking module 362, a bird-view transformer 367, and optionally a user interface 368. In certain embodiments, the storage device 353 may include other applications or modules necessary for the operation of the local camera application 354. It should be noted that the modules 356, 358, 362, 367 and 368 are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code, such that the computing speed may be increased dramatically.

The calibration module 356 is configured to calibrate the local camera 240, receive video from the local camera, calibrate the received video, and send the calibrated video to the 3D object detection module 358. Calibration is needed for the local camera 240 on the traffic pole. But since the camera is static, both intrinsic and extrinsic parameters are stable and the calibration process for each camera only needs to be performed once. In certain embodiments, the calibration process takes in a series of board images (such as a 8 columns, 6 rows board) of a chess board and then detects the chess board corners. The calibration process then iterates to find the sub-pixel accurate location of corners or radial saddle points. Based on these information, the embodiments calibrate the camera and derive the camera matrix, distortion coefficients, and translation and rotation vectors. The embodiments then calculate the projection matrix and rotation matrix. In certain embodiments, the calibration is performed by the calibration module 356. In certain embodiments, the calibration parameters may also be loaded into the camera 240, and the video outputted by the camera 240 is calibrated and then can be directly inputted to the 3D object detection module 358. In certain embodiments, the calibration parameters are provided to the 3D object detection module 358, and the camera 240 send the captured video directly to the 3D object detection module 358, such that the 3D object module 358 can process the video using the calibration parameters. In certain embodiments, the calibration module 356 is configured to store the calibration parameters, such as the projection matrix and the rotation matrix in the local camera application 354, and the stored calibration parameters are available to the modules of the local camera application 354.

The 3D object detection module 358 is configured to, upon receiving the video from the camera 240 or the calibrated video from the calibration module 356, detect 2D objects and 3D objects from the video frames, and send the 2D and 3D object detection result to the 3D object tracking module 362. In certain embodiments, as shown in FIG. 3, the disclosure provides two detector choices: 1) a top-down detector that consists of a 2D object detector followed by a 3D object regressor, i.e., the 2D object detection (2DOD) model 359 and the 3D object detection (3DOD) model 360, and 2) a bottom-up detector that simultaneously detect both the 2D and 3D objects in one shot, i.e., the single-shot 3D object detection (3DOD) module 361. The first detector is generic that the 2D object detector can be replaced freely, employing latest state-of-the-art methods. Since it is top-down, it inclines to better accuracy but with higher complexity, in terms of the speed-accuracy trade-off. The second detector is bottom-up, and the computational cost is not proportional to the number of objects. In certain embodiments, the 3D object detection module 358 further includes a decision mechanism to choose one of the top-down and the bottom-up methods. For example, when high accuracy is needed and the computing power of the computing device 350 is sufficient, or when the video does not include many objects, the 3D object detection module 358 may choose the top-down method. When there are a large number of objects in the video, the 3D object detection module 358 may choose the bottom-up method. In certain embodiments, according to the feature of the environment, the use of the top-down or the bottom-up method is predetermined, such that the 3D object detection module 358 of a local computing device 350 may only include the top-down method or only includes the bottom-up method.

The top-down 3D object detector includes the 2DOD model 359 and the 3DOD model 360. The 3DOD 360 has a 3D object regressor and a box regressor. The 2DOD model 359 is configured to, upon receiving the video frames or video images from the camera 240 or the calibration module 356, detect the 2D objects in the image coordinate system. The regions in the images closely enclosing the objects are defined as regions of interest (ROIs), each ROI is a region from the image that is cropped around for example one vehicle. The 2DOD model 359 is further configured to send the ROIs to the 3D object regressor. The 3D object regressor, upon receiving the ROIs, regresses the cropped RGB pixels into, for example, eight rectangular points of the vehicle (in the image coordinate system) where the vehicle is regarded as a cuboid, the dimensions of the vehicle (length, width, height), and the depth/distance from the camera 240. These information, together with the camera matrix, are fed into a final box regressor, and regress into refined vehicle size (height, width, length), vehicle center in the camera coordinate system (x, y, z) and the rotation angle $\theta$ in the y axis (i.e., the yaw axis).

In certain embodiments, the 2DOD model 359 includes at least one of two replaceable and out-of-the-shelf 2D object detectors: YOLOv3 and CenterNet. The 2D object detectors can be top-down or bottom-up, as long as they provide accurate 2D object regions. Therefore, the 2DOD model 359 is generic and modelized.

In certain embodiments, the 3D object regressor of the 3DOD model 360 is implemented by a pretrained ResNet34 backbone (fully connected layers removed), followed by 3 fully connected layers. The channels may be reduced from 512 to 256, 128, and finally 20. The 20 channels denote the eight points (2×8=16 channels), the coarse vehicle dimension (3 channels) and the coarse depth (1 channel).

In certain embodiments, the final box regressor is not a deep neural network (DNN) but an optimization algorithm. It geometrically estimate the 3D box parameters (x, y, z, h, w, l, $\theta$) by minimizing the difference between the regressed pixel coordinates and the ones obtained by projecting the estimated 3D box onto the image plane. In this minimization, the regressed 3D box size and distance are used for both initialization and regularization. This nonlinear least-squares problem is solved utilizing the least_squares method of the optimization module in SciPy, which implements the Trust Region Reflective algorithm.

The single-shot 3DOD module 361 is the one stage bottom-up 3D object detector. The single-shot 3DOD module 361 is configured to, upon receiving the video from the local camera 240 or from the calibration module 356, jointly detect 2D and 3D bounding boxes from the video frames. In certain embodiments, the disclosure takes in the whole input video frame and regresses the centers of objects, as well as the corresponding attributes of these objects, including the 2D object information such as width, height, offset (to help with the down-sampling discrepancy) and 3D object information such as vehicle dimension, distance/depth, and orientation $\theta$ in the yaw axis. The process may be implemented by a fully convolutional network, specifically, a backbone (two alternatives: Hourglass and deformable Resnet) pretrained on ImageNet, followed by a 3D object detection head. The head is implemented by a 3×3 convolutional layer followed by a point-wise convolutional layer. The number of output channels is identical to the number of attributes to estimate. The output resolution is ¼ of the input image, i.e., 64 by 64 when the input frame is resized to 256 by 256. Therefore, the output tensor is of size 64×64×18. In the bottom-up single-shot 3DOD module, the 18 channels consist of: (1) 3 channels for center keypoints of each class: car, truck, pedestrian/cyclist; (2) 2 channels for 2D bounding box: width, height; (3) 2 channels for center keypoints' offset (to recover a keypoint from the 64×64 map to its original position in the 256×256 map): $\Delta_u$, $\Delta_v$; (4) 1 channel for the depth estimation of each object; (5) 4 channels for rotation: 2 for bin classification and 2 for in-bin regression; (6) 3 channels for 3D object shape: (w, h, l); (7) 1 channel to record indices; (8) 1 channel for the mask of offset; (9) 1 channel for the mask of rotation. The disclosure decodes the tensor with the following procedure:

(1) Find the local peaks of the heatmaps by applying a 3×3 max pooling operation on these heatmaps, respectively.

(2) Find the Top K peaks for these heatmaps, respectively, depending on the heatmap response.

(3) Flatten the 2D image coordinate system to 1D and find the indices of these Top K peaks.

(4) Take these peaks and organize into the final output tensor, providing the handy information about the 3D objects, i.e., the center coordinates, the dimension, depth, rotation, score, vehicle class, etc.

In certain embodiments, the disclosure implements the one-shot 3D object detector with APACHE MXNet, as MXNet provides both imperative mode and symbolic mode. Imperative mode is easy to use during development and debugging, as we can have access to intermediate tensor results. Symbolic mode is faster during inference. The symbols and trained weights can be re-used and easily employed in different target platforms. In certain embodiments, the symbolic inference part is implemented in C++, which is convenient for various platforms.

The 3D object tracking module 362 is configured to, upon receiving the 2D and 3D object detection result from the 3D object detection module 358, track the detected objects in the video frames, and send the tracking result to the bird-view transformer 367. The tracking result includes trajectories of the detected objects. As shown in FIG. 3, the 3D object tracking module 362 may perform the tracking using a 3D Kalman filter module 363 and a Hungarian algorithm module 364, or alternatively using a GC-LSTM module 365 and a Siamese graphic convolutional (SGC) module 366.

When the 3D Kalman filter module 363 and the Hungarian algorithm module 364 are used for tracking, the 3D Kalman filter module 363 is configured to smooth the trajectories using Kalman filter and the Hungarian algorithm module 364 is configured to update identities of objects using Hungarian algorithm. In certain embodiments, the disclosure applies Kalman filter to both the 2D detection result and 3D detection result. During data association, the disclosure applies the Hungarian algorithm to associate identities, i.e., to assign the correct detected measurements to predicted tracks. The procedure is described in detail below:

(1) If no prior tracks are available, create tracks. In the system of the disclosure, a track is an entity consisting of several attributes, including a) the prediction vector representing both the 2D and 3D locations, b) the unique track ID, c) the Kalman filter instances for both 2D and 3D objects, d) the trajectory history of this track, represented by a list of prediction vectors. In terms of the Kalman filter instance, it keeps track of the estimated state of the system and the variance or uncertainty of the estimate. In this case, the state vector is the 2D/3D object location, represented by a vector of coordinates.

(2) Calculate the predictions of the Kalman filters based on tracking history, and then calculate the cost between the predictions and the current detections from the detection module. The cost is defined as the Euclidean distance of detections and predictions, which is weighted on the 2D and 3D coordinates.

(3) Use the Hungarian algorithm to associate the correct track instance (detected measurements, trajectory history) to the predictions based on the cost.

(4) Create new track entities for unassigned (meaning new) detections.

(5) For each track, mark it as unassigned if the cost of its assigned association is higher than a threshold. The unassigned tracks are kept in memory for some time in case they reappear shortly. Remove unassigned tracks, if the following condition is met: the objects in these tracks have not been detected for certain number of frames.

(6) Update the states of the Kalman filters for each track instance based on the assigned 2D and 3D predictions, so that the Kalman filters can maintain accurate prediction capability with the latest input.

In certain embodiments, the above 3D object tracking using Kalman filter and Hungarian algorithm is a light-weight choice since Kalman filter only takes into account the location histories but not the global visual cues. Therefore, the 3D object tracking module 362 further provides a heavier tracking module-GC-LSTM module 365, which is computationally expensive but more accurate. Depending on the computational power of the computing device 350, the 3D object tracking can be conveniently switched between the Kalman filter/Hungarian algorithm route and the GC-LSTM route. The GC-LSTM route takes care of occlusion in the videos very well.

Figure 4:
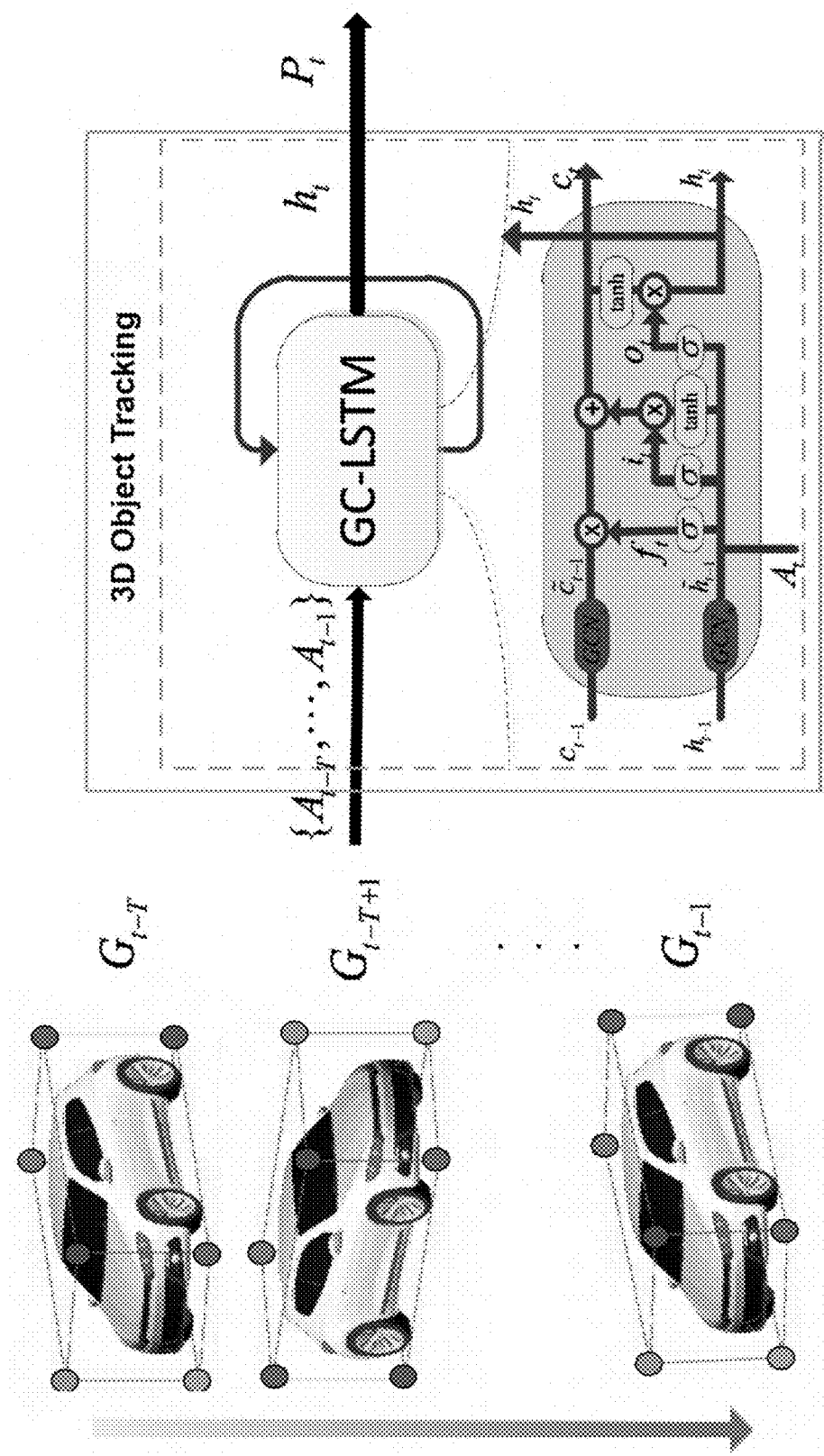
FIG. 4 schematically depicts a graph convolution-long short term memory (GC-LSTM) for 3D object tracking according to certain embodiments of the present disclosure.

The GC-LSTM module 365 is a bottom-up 3D object tracker. In certain embodiments, the GC-LSTM module 365 treats objects as points, i.e., representing the 3D objects as the center points in the image coordinate system, with additional attributes related to these center points, such as 3D object dimension, depth, and rotation in yaw axis, etc. In certain embodiments, as shown in FIG. 4, the GC-LSTM module 365 is configured to treat each vehicle as a set of keypoints. Specifically, the GC-LSTM module 365 takes the nine points (vehicle center plus eight 3D box vertices) in the camera coordinate system as an object. The GC-LSTM module 365 is configured to extract light-weight low-level features around the vehicle center keypoint, e.g., local binary patterns (LBP), histogram of oriented gradients (HOG), color histograms, or their combinations. Each keypoint is represented by its 3D coordinates, and optionally, concatenated with some local visual features for the center point. As shown in FIG. 4, these keypoint representations are input to the GC-LSTM model, which takes into account temporal-spatial cues to tackle occlusion and smooths the tracking trajectories. Specifically, a time series of vehicle 3D detection bounding boxes $G_{t-T}, G_{t-T+1}, \ldots, G_{t-1}$ are transformed into corresponding vector representations $A_{t-T}, A_{t-T+1}, \ldots, A_{t-1}$, the vector representations are fed to the GC-LSTM model, and the GC-LSTM then outputs a prediction of the 3D bounding box at time t: $P_t$.

In certain embodiments, when a 3D detection deviates from the corresponding GC-LSTM prediction from previous frames, the GC-LSTM module 365 regards the tracked vehicle to be lost and performs data association to link the detection to track histories. In certain embodiments, the GC-LSTM module 365 further includes a data association model, such as LightTrack-GCN to perform the data association. For example, the GC-LSTM module 365 may treat the data association process as a re-identification (Re-ID) problem and use a Siamese GCN network to classify whether a 3D detection matches a 3D track prediction. To improve LightTrack-GCN, in certain embodiments, the GC-LSTM module 365 is configured to feeds the keypoint coordinates as well as the local visual features as input to the GCN network, so that the Siamese GCN network classifies pairs with both spatial layout and visual features. Consider a 3D vehicle, the keypoints encode its orientation, dimension and position, while the visual features may encode the color, texture and other vehicle appearance patterns.

In certain embodiments, the GC-LSTM route further includes the SGC module 366, which is used for Re-ID of the objects when the tracking by the GC-LSTM module 365 deviates from the detection. In certain embodiments, the SGC module 366 is LightTrack described in Ref. 13, which is incorporated herein by reference in its entirety.

In certain embodiments, the 3D object tracking module 362 further includes a decision mechanism to use the 3D Kalman filter module 363 and the Hungarian algorithm module 364 for 3D object tracking, or to use the GC-LSTM module 365 for 3D object tracking. After tracking is performed, referring back to FIG. 3, the 3D object tracking module 362 is further configured to send the tracking result to the bird-view transformer 367.

Figure 5:
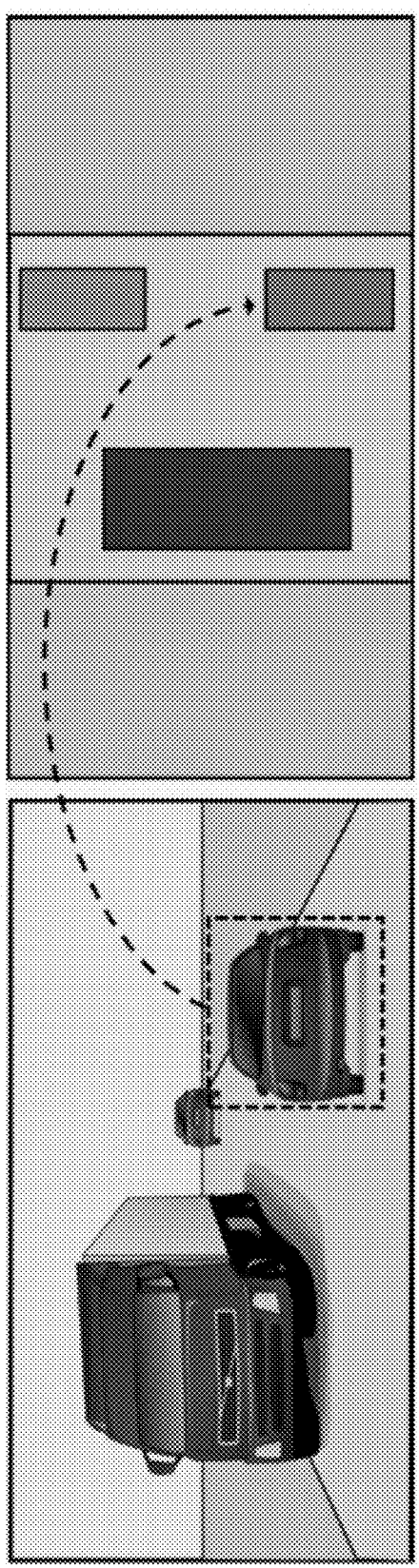
FIG. 5 schematically depicts transform of a camera view to a bird-view according to certain embodiments of the present disclosure.

The bird-view transformer 367 is configured to, upon receiving the video frames, the detected 2D and 3D objects, and the trajectories of the 3D objects, transform the information to bird-view (or bird's eye view) in the camera coordinate system. FIG. 5 schematically shows transform from camera image view to bird-view. The bird-view stores global spatial information for the traffic scene, which can be useful in several applications including: (1) cooperative maneuvering for autonomous vehicles; and (2) cooperative risk warning.

In certain embodiments, the user interface 368 is configured to provide a user interface or graphic user interface in the computing device 350. In certain embodiments, the user or the administrator of the system is able to configure parameters for the computing device 350.

In certain embodiments, the local camera application 354 may further include a database, which may be configured to store at least one of calibration parameters for the camera 240, the captured video frames, and detection and tracking result of the video frames. However, the local camera application 354 is preferred to have the video to be processed, the calibration parameters, the bounding boxes, etc. loaded in the memory 352 for fast processing.

In the above embodiments, each of the 3D object detection module 358 and the 3D object tracking module 362 includes two different route for object detection and object tracking and optionally mechanisms to choose one from the two routes. In certain embodiments, each of the 3D object detection module 358 and the 3D object tracking module 362 includes only one of the two routes. For example, the 3D object detection module 358 only includes the single-shot 3DOD module 361 and the 3D object tracking module 362 only includes the GC-LSTM module 365.

Referring back to FIG. 2, when the bird-view for each local camera 240 is available, the RSUs 230 transmit the bird-views from different local application servers 250 to the master server 210. The master server 210 is configured to map the bird-views in the camera coordinate systems into a world coordinate system, and combines the bird-views to obtain a global bird-view in the world coordinate system. Each local application server 250 corresponds to a different camera located in a different traffic pole or from a different angle, the vehicles are actually perceived by multiple cameras (they extend the coverage of each other but also have overlaps to prevent blind spot) and result in multiple camera coordinate systems. The master server 210 is configured to map the vehicle from various camera coordinate systems to the uniform world coordinate system.

Once the information on camera coordinates are transmitted from the local RSUs 230 to the master server 210, the world coordinates are derived and synchronized, and the master server 210 can further perform more advanced cooperative maneuvering 270 and the cooperative risk warning 290 because it has a high-level sensing and perception of the whole traffic in this region. In certain embodiments, there may be a specific cooperative maneuvering server and a specific cooperative risk warning server working with the master server 210 to perform the corresponding functions.

In certain embodiments, the world coordinate system is built after measuring the distance of the traffic pole cameras (the rotation matrix of the cameras are also derived during camera calibration). Since traffic pole cameras are static and only need to be installed once, the world coordinate system is very stable and reliable.

In certain embodiments, the local camera application 354 may further include a scheduler to schedule the process of the video frames or video images For example, the scheduler may determine keyframes from the time series of video frames for object detection and tracking, the schedular may define sliding window of several video images for being processed as a batch, the scheduler may load the video frames to the memory 352 in real time. In certain embodiments, the scheduler may be further configured to maintain certain input and output of the video frame processing steps in the memory 314. The input and output information may include object or target ID, bounding box ID (optionally), points or vertices of the 2D or 3D boxes, vectors representing 2D and 3D detection of the objects. In certain embodiments, the scheduler may also store those information in the storage device 353. In certain embodiments, the scheduler is also configured to call the modules of the local camera application 354 to perform their corresponding functions at different time.

Figure 6:
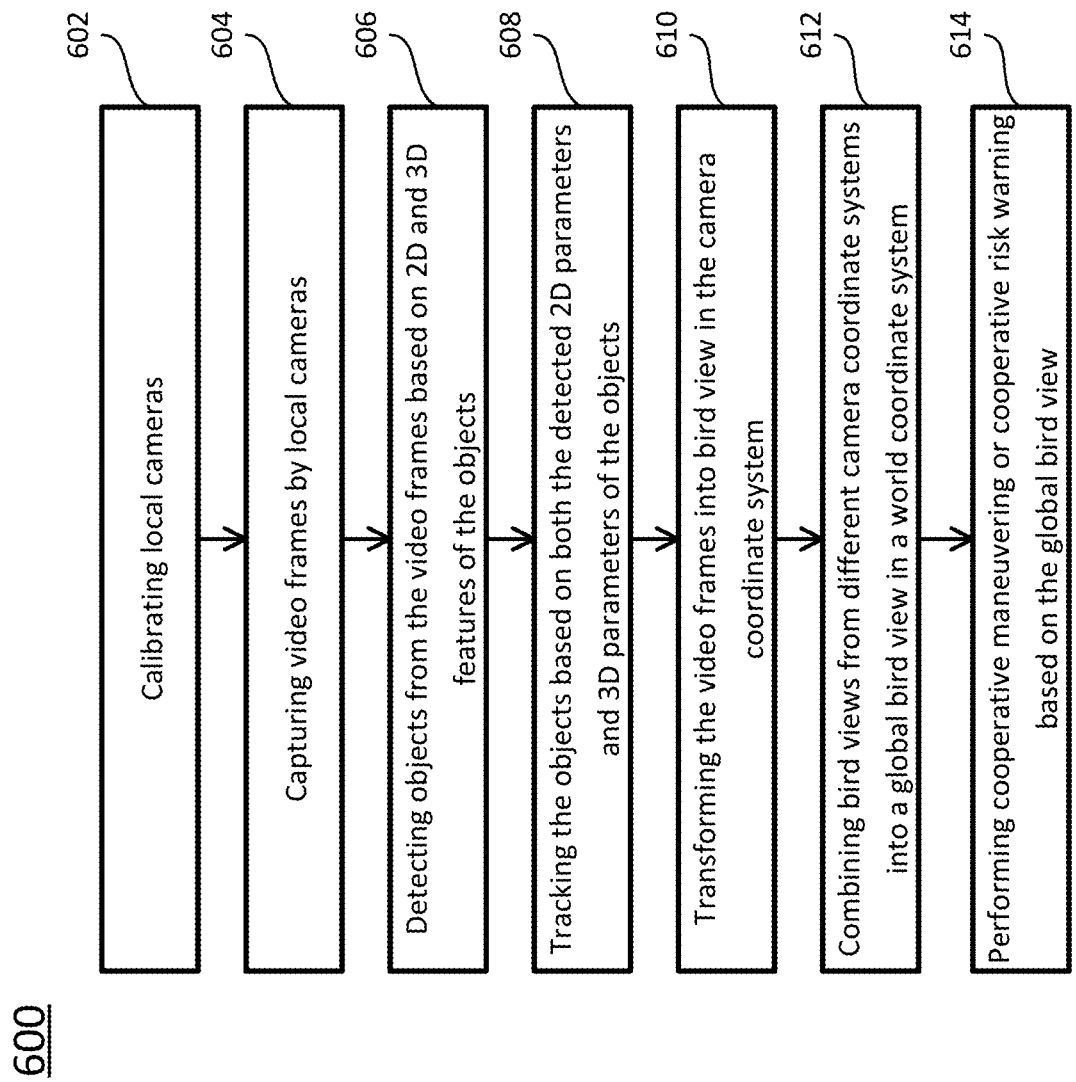
FIG. 6 schematically depicts a process of 2D and 3D detection and tracking for cooperative maneuvering and cooperative risk warning according to certain embodiments of the present disclosure.

FIG. 6 schematically depict a process for 3D object detection and tracking according to certain embodiments of the present disclosure. In certain embodiments, the detection and tracking process is performed by a computing device, such as the computing device 350 shown in FIG. 3 (or the application server 250 shown in FIG. 2), and specifically by the local camera application 354. It should be particularly noted that, unless otherwise stated in the present disclosure, the steps of the object detection and tracking process or method may be arranged in a different sequential order, and are thus not limited to the sequential order as shown in FIG. 6.

As shown in FIG. 6, at procedure 602, the calibration module 356 calibrates the local camera 240. In certain embodiments, the local camera 240 is a monocular surveillance camera. The local camera 240 is installed on a fixed structure, for example a traffic pole. When there are many traffic poles in a defined area, each traffic pole may be installed with a local camera 240 and a corresponding computing device 350 for processing images from the local camera 240. The following process is described in regard to one local camera 240 and one corresponding computing device 350 (or the local application server 250) installed on the same traffic pole. However, there may be more than one local cameras 240 installed on the same traffic pole facing different directions, and the corresponding computing device 350 may not have to installed on the same traffic pole. These different cameras and computing device arrangement can be accommodated to the present process with slight variation of the system. In certain embodiments, the calibration module 356 performs the calibration of the local camera 240 using a chess board. By taking images of the chess board in different locations in the camera view, parameters of the local camera 240 can be determined. The calibration may only need to be performed once after the installation of the local camera 240, and calibrated camera parameters may be stored as a data file in the local camera application 354. In certain embodiments, the calibration may also be performed at predetermined time intervals, such as once a year or twice a year, to compensate the variations of the local camera 240 and the environment. In other embodiments, the calibration may be performed after a change of the traffic pole or the local environment.

At procedure 604, the local camera 240 captures a video of the environment, and provides the video to the 3D object detection module 358. The video may be calibrated before being inputted to the 3D object detection module 358 or calibrated before or during the object detection. In certain embodiments, the video is taken at real time, and the frames of the video are inputted to the 3D object detection module 358 continuously or by batch. In certain embodiments, the local camera application 354 may have a scheduler to schedule the process of the video frames. For example, the scheduler may use a sliding window to process the video frames by batch, each batch may include, for example three to five frames, and the neighboring batches of the video frames may have overlapped frames. For example, the first batch of frames are frames 0, 1, 2, the second batch of frames are frames 1, 2, 3, and the third batch of frames are frames 2, 3, and 4. In certain embodiments, the scheduler may also choose key frames from the video frames, and only provides the key frames for object detection and tracking.

At procedure 606, upon receiving the video frames, the 3D object detection module 358 detects 2D objects and 3D objects from the video frames, and sends the detected 2D objects and 3D objects parameters to the 3D object tracking module 362. In certain embodiments, the 3D objection detection module 358 uses a top down route or a bottom up route for the detection. In certain embodiments, the 3D object detection module 358 makes a choice between using the top down route or the bottom up route. The choice may be determined by, for example, the computing resource and the required detection accuracy. In certain embodiments, the bottom up route is the preferred method for detection, especially when there are many objects in the video frames. In certain embodiments, the 3D object detection module 358 may only include one of the two routes.

When the top down route is used, upon receiving a video frame, the 2DOD model 359 detects 2D objects in the frame. The 2D object detection may be performed using YOLOv3 or CenterNet. Because the disclosure may only need to detect vehicles in the frames, the 2D object detection parameters may be configured to fit the vehicle detection task, such that the 2D object detection can be performed more efficiently. The detected 2D objects are represented by bounding boxes. The bounding box parameters may include locations and sizes of the bounding boxes in the image coordinate system defined by pixels. After 2D object detection, the 2D bounding boxes are then cropped out from the frame, and the 3DOD model 360 performs 3D object detection on each of the cropped bounding boxes. In certain embodiments, the 3D detection is performed by a neural network, and the neural network is performed on each of the 2D bounding boxes to obtain corresponding 3D information of the object. In certain embodiments, the neural network includes a pretrained ResNet34 backbone with several fully connected layers. The detected 3D object may be in a form of a 3D box, which is represented by 8 vertices of the 3D box, a center point, and a yaw angle of the 3D box. Because the 3D object detection is based on the 2D bounding boxes, the 3D object detections is fast and reliable.

When the bottom up route is used, upon receiving a video frame, the single-shot 3DOD module 361 regresses 2D object information and 3D object information from the RGB frame simultaneously. In certain embodiments, the single-shot 3DOD module 361 includes a pretrained backbone followed by a 3D object detection head. The backbone may be Hourglass or deformable Resnet. The obtained detection may include 2D object information such as width, height, offset of the 2D bounding box, and 3D object information such as vehicle dimension, distance/depth, and orientation in the yaw axis of the 3D box.

As described above, after obtaining the 2D object information and 3D object information from the top-down route or the bottom up route, the 3D object detection module 358 further sends the detected 2D object information and 3D object information to the 3D object tracking module 362.

At procedure 608, upon receiving 2D information and 3D information from the 3D object detection module 358, the 3D object tracking module 362 tracks objects based on the 2D information and 3D information in the frames, and provides the tracked objects to the bird-view transformer 367. By using both 2D detection information and 3D detection information, the tracking is more accurate. In certain embodiments, the 3D objection tracking module 362 uses one of two routes for tracking. The two routes are the 3D Kalman filter and Hungarian algorithm route and the GC-LSTM route. In certain embodiments, the 3D object tracking module 362 makes a choice between using the two routes. In certain embodiments, the GC-LSTM route is preferred which provide more accurate tracking efficiently. In certain embodiments, the 3D object tracking module 362 may only include one of the two routes.

When the 3D Kalman filter and Hungarian algorithms route is used, the 3D Kalman filter module 363 smooths trajectories of objects, and the Hungarian algorithm module 364 update identities of the objects. For example, multiple sequential frames 0, 1, 2 are used as input of the 3D Kalman filter module 363, and the 2D detection and 3D detection from the frames are represented by vectors. The frame 2 is the current frame, and the frames 0 and 1 are immediate previous frames. Each detected object corresponds to a vector, and the vector thus include both the 2D information and the 3D information of the object. The 3D Kalman filter module 363 can detect the noise in the scaler dimensions of the vector, and smooth the vectors corresponding to the detected objects. When the 2D detection is inaccurate or the 3D detection is inaccurate in a vector, the 3D Kalman filter module 363 can use the corresponding 3D detection or the 2D detection in the same vector to correct the inaccuracy. After smoothing of the trajectory of an object in the frames 0, 1 and 2, the 3D Kalman filter module 363 provide a prediction of the object in the current frame 2. This prediction may still be represented as a vector, and the predicted 2D bounding box location and 3D points locations and orientation indicated by the predicted vector are more accurate than that indicated in the inputted vector, because the prediction considers and compensates the sequential variation of the object in the frames 0, 1, 2, and considers the noises in the frames 0, 1 and 2. The smoothed, predicted vector of the object is then applied to the Hungarian algorithm module 364, such that the Hungarian algorithm module 364 confirms or reassigns an identification for the object by matching the objects in different frames, calculating the cost of the match, keeping the same ID if the cost is less than a threshold, and changing the ID or assigning a new ID for the object if the cost is greater than a threshold. The process continues, for example by processing the frames 1, 2, 3 to give prediction of the object in frame 3, and by processing the frames 2, 3, 4 to give prediction of the object in frame 4. In certain embodiments, the number of frames for each prediction may be more or less than the above three frames. In the above embodiments, the 3D Kalman filter module 363 and the Hungarian algorithm module 364 process the frames in serial. In other embodiments, the 3D Kalman filter module 363 and the Hungarian algorithm module 364 may also process the frames in parallel, which may make the prediction process faster. However, the serial processing is preferred, because it is faster and more reliable when the Hungarian algorithm module 364 performs re-ID using the trajectories of the objects that are smoothed by the Kalman filter module 363.

When the GC-LSTM and SGC route is used, the GC-LSTM module 365 smooths the detection vector and updates the ID of the objects simultaneously, and the SGC module 366 performs Re-ID of the objects when the predicted tracking deviates from the 3D detection. The inputs of the GC-LSTM not only includes the 2D detection information and 3D detection information, but also the visual attributes of the objects, for example, around the center points of the objects. Those visual attributes of the objects many be extracted using LBP, HOG, or color histograms. In other words, the input for the GC-LSTM is graph, the graph includes characteristic points of the objects and the visual attributes of the objects, and the output is the predicted graph including location and orientation of the object, and optionally the visual attributes of the objects. GC-LSTM is used to infer the vehicle's smooth location given location histories. Function of GC-LSTM is similar to the function of Kalman filter, but GC-LSTM is more robust to occlusion because it takes into account spatiotemporal cues. In certain embodiments, when the tracking by the GC-LSTM 365 deviates from the 3D detection, Re-ID is needed. The Re-ID is performed by the SGC module 366. In one example, if there are 5 cars in each of the frames 0, 1, 2, and the 5 cars in each frame are extracted as 5 graphs, the 5 graphs for each of the frames 0, 1 and 2 will be used as input of GC-LSTM, and the outputs are predicted 5 graphs in the current frame-frame 2. Although GC-LSTM may cost more computing resource than the Kalman filter, it may cost less than the combination of Kalman filter and the Hungarian algorithm. Therefore, GC-LSTM route may be a more accurate and efficient route. In certain embodiments, the video frames used for detection and tracking are sequential frames. In certain embodiments, the detecting and tracking may also be performed on frames with certain time intervals, or use only key keyframes.

As described above, after obtaining the tracking from any of the above two route, the 3D object tracking module 362 further sends the video frames, the predicted 2D bounding boxes and 3D object boxes, and trajectories of the objects to the bird-view transformer 367.

At procedure 610, upon receiving the video frames, the detection information, and the tracking information, the bird-view transformer 367 converts the video frames, the detection information, and the tracking information into bird-view, and sends the bird-view to the master server 210 via the RUS 230.

At procedure 612, upon receiving the bird-views from different computing devices 350 (or the application severs 250), the master server 210 combines those bird-view as one global bird-view in the world coordinate system. In certain embodiments, the bird-view transformer 267 may also be located in the master server 210, and the bird-view transformer 267 converts the views of the frames, the detection information, and the tracking information under different camera coordinate systems from different application servers 250 into a global bird-view under the world coordinate system. In certain embodiments, the overlap of the bird-views corresponding to different cameras help to improve the global bird-view of the objects.

At procedure 614, when the global bird-view is available, the master server 210 can perform real time cooperative maneuvering by controlling the self-driving vehicles in the region and/or cooperative risk warning by sending warning message to the vehicles in the region.

In certain aspects, the present disclosure relates to a non-transitory computer readable medium storing computer executable code. In certain embodiments, the computer executable code may be the software stored in the storage device 353 as described above. The computer executable code, when being executed, may perform the methods described above.

Certain embodiments of the present disclosure, among other things, have the following novel advantages:

(1) The disclosure provides a unique 3D object detection and tracking system with monocular surveillance cameras for cooperative vehicle-infrastructure systems (CVIS).

(2) The disclosure provide a first CVIS system to track 3D vehicles based on traffic-pole based monocular camera. With the low cost and wide-spread monocular surveillance cameras and optionally a 5G network, the design of the CVIS is reliable and cost effective.

(3) The disclosure is the first to employ GC-LSTM for 3D object tracking.

(4) The disclosure is the first to employ Siamese GCN for data association in 3D object tracking.

(5) The 3D object detection and tracking system of the disclosure is also generic in some of its submodules, such as 2D object detection, 3D object detection and multi-target tracking, which are replaceable and can be upgraded.

(6) The 3D object detection and tracking system of the disclosure can also be used as a sub-system or a service by third-party cooperative vehicle-infrastructure systems.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

LISTING OF REFERENCES (INCORPORATED HEREIN BY REFERENCE IN THEIR ENTIRETIES)

1. Sheng-hai An, Byung-Hyug Lee, and Dong-Ryeol Shin, A survey of intelligent transportation systems, 2011 Third International Conference on Computational Intelligence, Communication Systems and Networks, IEEE, 2011.
2. Ling Sun, Yameng Li, and Jian Gao, Architecture and application research of cooperative intelligent transport systems, Procedia Engineering, 2016, 137: 747-753.
3. Cooperative vehicle infrastructure system (CVIS) and vehicle to everything (V2X) industry report, 2018.
4. Shangguan Wei, Yu Du, and Linguo Chai, Interactive perception-based multiple object tracking via CVIS and AV, IEEE, 2019, 7: 121907-121921.
5. Tong He, and Stefano Soatto, Mono3d++: monocular 3D vehicle detection with two-scale 3D hypotheses and task priors, AAAI, 2018, 8409-8416.
6. Xiaozhi Chen, Kaustav Kundu, Yukun Zhu, Andrew Berneshawi, Huimin Ma, Sanja Fidler, and Raquel Urtasun, 3D object proposals for accurate object class detection, NIPS, 2015.
7. Arsalan Mousavian, Dragomir Anguelov, John Flynn, and Jana Kosecka, 3D bounding box estimation using deep learning and geometry, CVPR, 2017, 5632-5640.
8. Erik Linder-Norn and Fredrik Gustafsson, Automotive 3d object detection without target domain annotations, Master of Science Thesis, 2018.
9. Joseph Redmon, and Ali Farhadi, YOLOv3: An incremental improvement, 2018, arXiv:1804.02767.
10. Xingyi Zhou, Dequan Wang, and Philipp Krahenbuhl, Objects as Points, 2019, arXiv:1904.07850.
11. Hou-Ning Hu, et al., Joint monocular 3D Vehicle detection and tracking, Proceedings of the IEEE ICCV, 2019, 5390-5399.
12. Jason Ku, Alex D. Pon, and Steven L. Waslander, Monocular 3D object detection leveraging accurate proposals and shape reconstruction, Proceedings of the IEEE CVPR, 2019, arXiv:1904.01690.
13. Guanghan Ning, and Heng Huang, LightTrack: a generic framework for online top-down human pose tracking, 2019, arXiv:1905.02822.

What is claimed is:

1. A system, comprising:

a camera; and a computing device in communication with the camera, wherein the computing device is configured to:

receive a plurality of video frames from the camera;

detect an object from the video frames, wherein the detected object in each of the video frames is represented by a detection vector, the detection vector comprises first dimensions representing two dimensional (2D) parameters of the object and second dimensions representing three dimensional (3D) parameters of the object;

track the object in the video frames based on the detection vectors of the object from the video frames to obtain a trajectory of the object, wherein minimization of loss in tracking of the object is calculated based on the first dimensions and the second dimensions of the detection vectors; and transform the video frames into bird-view, wherein the bird view of the video frames comprises the trajectory of the object.

2. The system of claim 1, wherein the object is a vehicle, and the system further comprises a server computing device configured to receive the bird-view of the video frames from the computing device, and to perform at least one of cooperative maneuvering and cooperative risk warning using the received bird-view of the video frames.

3. The system of claim 2, wherein the computing device, the server computing device and the vehicle are in communication through 5th generation mobile network.

4. The system of claim 1, wherein the 2D parameters of the object comprises location and size of a 2D bounding box in the corresponding one of the video frames that encloses the object, and the 3D parameters of the object comprises vertices, center point, and orientation of a 3D box in the corresponding one of the video frames that encloses the object.

5. The system of claim 4, wherein the computing device is configured to detect the 2D parameters and the 3D parameters of the object simultaneously using a single-shot 3D object detector.

6. The system of claim 4, wherein the computing device is configured to detect the 2D parameters of the object using a 2D object detector and detect the 3D parameters of the object using a 3D object detector, the 2D detector detects the 2D parameters of the object from the video frame, and the 3D object detector detects the 3D parameters of the objects from the 2D parameters.

7. The system of claim 1, wherein the computing device is configured to track the object using a graphic convolution-long short term memory (GC-LSTM) network, and the GC-LSTM network employs a Siamese graph convolutional network (GCN) to associate identification of the object in the video frames based on the 2D parameters of the object, the 3D parameters of the object, and visual features of the object.

8. The system of claim 1, wherein the computing device is configured to track the object using a Kalman filter and a Hungarian algorithm, the Kalman filter is used to optimize the 2D parameters and the 3D parameters of the detected object, and the Hungarian algorithm is used to associate identification of the object in the video frames.

9. The system of claim 1, wherein the camera comprises a monocular surveillance camera.

10. The system of claim 9, wherein the computing device is further configured to calibrate the monocular surveillance camera.

11. The system of claim 1, wherein the computing device is configured to detect the object and track the object using a build-in chip.

12. A method, comprising:

receiving, by a computing device, a plurality of video frames captured by a camera;

detecting, by the computing device, an object from the video frames, wherein the detected object in each of the video frames is represented by a detection vector, the detection vector comprises first dimensions representing two dimensional (2D) parameters of the object and second dimensions representing three dimensional (3D) parameters of the object;

tracking, by the computing device, the object in the video frames based on the detection vectors of the object from the video frames to obtain a trajectory of the object, wherein minimization of loss in tracking of the object is calculated based on the first dimensions and the second dimensions of the detection vectors; and transforming, by the computing device, the video frames into bird-view, wherein the bird view of the video frames comprises the trajectory of the object.

13. The method of claim 12, wherein the object is a vehicle, and the method further comprises:

receiving, by a server computing device, the bird-view of the video frames from the computing device; and performing, by the server computing device, at least one of cooperative maneuvering and cooperative risk warning using the received bird-view of the video frames.

14. The method of claim 12, wherein the 2D parameters of the object comprises location and size of a 2D bounding box in the corresponding one of the video frames that encloses the object, and the 3D parameters of the object comprises vertices, center point, and orientation of a 3D box in the corresponding one of the video frames that encloses the object.

15. The method of claim 14, wherein the detection of the 2D parameters and the 3D parameters of the object is performed simultaneously using a single-shot 3D object detector.

16. The method of claim 14, wherein the detection of the 2D parameters and 3D parameters of the object are performed respectively using a 2D object detector and a 3D object detector, the 2D detector detects the 2D parameters of the object from the video frame, and the 3D object detector detects the 3D parameters of the objects from the 2D parameters.

17. The method of claim 12, wherein the step of tracking the object is performed using a graphic convolution-long short term memory (GC-LSTM) network, and the GC-LSTM network employs a Siamese graph convolutional network (GCN) to associate identification of the object in the video frames based on the 2D parameters of the object, the 3D parameters of the object, and visual features of the object.

18. The method of claim 12, wherein the step of tracking the object is performed using a Kalman filter and a Hungarian algorithm, the Kalman filter is used to optimize the 2D parameters and the 3D parameters of the detected object, and the Hungarian algorithm is used to associate identification of the object in the video frames.

19. The method of claim 12, wherein the camera comprises a monocular surveillance camera.

20. A non-transitory computer readable medium storing computer executable code, wherein the computer executable code, when executed at a processor of a computing device, is configured to:

receive a plurality of video frames from a camera;
detect an object from the video frames, wherein the detected object in each of the video frames is represented by a detection vector, the detection vector comprises first dimensions representing two dimensional (2D) parameters of the object and second dimensions representing three dimensional (3D) parameters of the object;
track the object in the video frames based on the detection vectors of the object from the video frames to obtain a trajectory of the object, wherein minimization of loss in tracking of the object is calculated based on the first dimensions and the second dimensions of the detection vectors; and
transform the video frames into bird-view, wherein the bird view of the video frames comprises the trajectory of the object.

\* \* \* \* \*